United States Patent [19]

Winter et al.

[11] Patent Number: 4,519,186
[45] Date of Patent: May 28, 1985

[54] DEVICE FOR ATTACHING TUBULAR SEGMENTS OF PLASTIC FILM ON VESSELS

[75] Inventors: Horst Winter, Obertraubling; Erich Eder, Donaustauf, both of Fed. Rep. of Germany

[73] Assignee: Krones Aktiengesellschaft Hermann Kronseder Maschinenfabrik, Neutraubling, Fed. Rep. of Germany

[21] Appl. No.: 470,035

[22] Filed: Feb. 28, 1983

[30] Foreign Application Priority Data

Mar. 3, 1982 [DE] Fed. Rep. of Germany ....... 3208234

[51] Int. Cl.$^3$ .................. B65B 11/00; B65B 13/00
[52] U.S. Cl. ......................... 53/585; 53/292; 156/86; 156/567; 156/568; 156/DIG. 12; 156/DIG. 31
[58] Field of Search ............ 53/292, 295, 291, 49, 53/585, 556; 156/86, 567, 568, DIG. 12, DIG. 31, DIG. 5, DIG. 6

[56] References Cited

U.S. PATENT DOCUMENTS

| | | | |
|---|---|---|---|
| 2,644,628 | 7/1953 | Gunter et al. | 53/291 |
| 2,752,030 | 6/1956 | Erickson | 53/291 |
| 2,815,627 | 12/1957 | Eddison | 53/291 |
| 3,871,943 | 3/1975 | Zodrow | 156/DIG. 31 |
| 4,144,631 | 3/1979 | Fujio | 156/86 |
| 4,184,309 | 1/1980 | Amberg | 53/292 |
| 4,238,267 | 12/1980 | Konstantin | 53/292 |
| 4,293,364 | 10/1981 | Fujio | 53/292 |

Primary Examiner—Daniel C. Crane
Attorney, Agent, or Firm—Fuller, House & Hohenfeldt

[57] ABSTRACT

A device for slipping segments of film, such as originally flattened but tubular segments of plastic film, on vessels such as bottles. A rotor rotates about a horizontal axis. Sucker devices mounted on swivel arms and expanding mandrels are arranged alternately about the circumference of the rotor. The flat sleeve segments are fed toward the rotor and are attracted by a sucker device. As the rotor rotates from the position in which a sleeve is gripped by a sucker device the sucker parts spread to open the tubular sleeve and the arm carrying the sucker is caused to swing and turn the sleeve segment 90° whereupon the sleeve is passed over the presently unexpanded mandrel which is circumferentially adjacent the designated arm and its suckers. The mandrel is caused to expand for holding the sleeve and the sucker is timely released. Meanwhile, the mandrel is caused to turn so the axis of the tubular sleeve changes from a true radial direction to a vertical direction at which time the tubular sleeve begins to slip over one of the moving vessels. As the vessel advances out of a screw conveyor at this time, the vessel enters between parallel belts that decline in the direction of vessel movement. The belts frictionally grip the sleeve and pull it down further onto the vessel. A big advantage of the apparatus is that about 180 degrees of rotor rotation are available to effect gripping a sleeve with the suckers, transferring it to a mandrel and then transferring it to the vessel.

13 Claims, 4 Drawing Figures

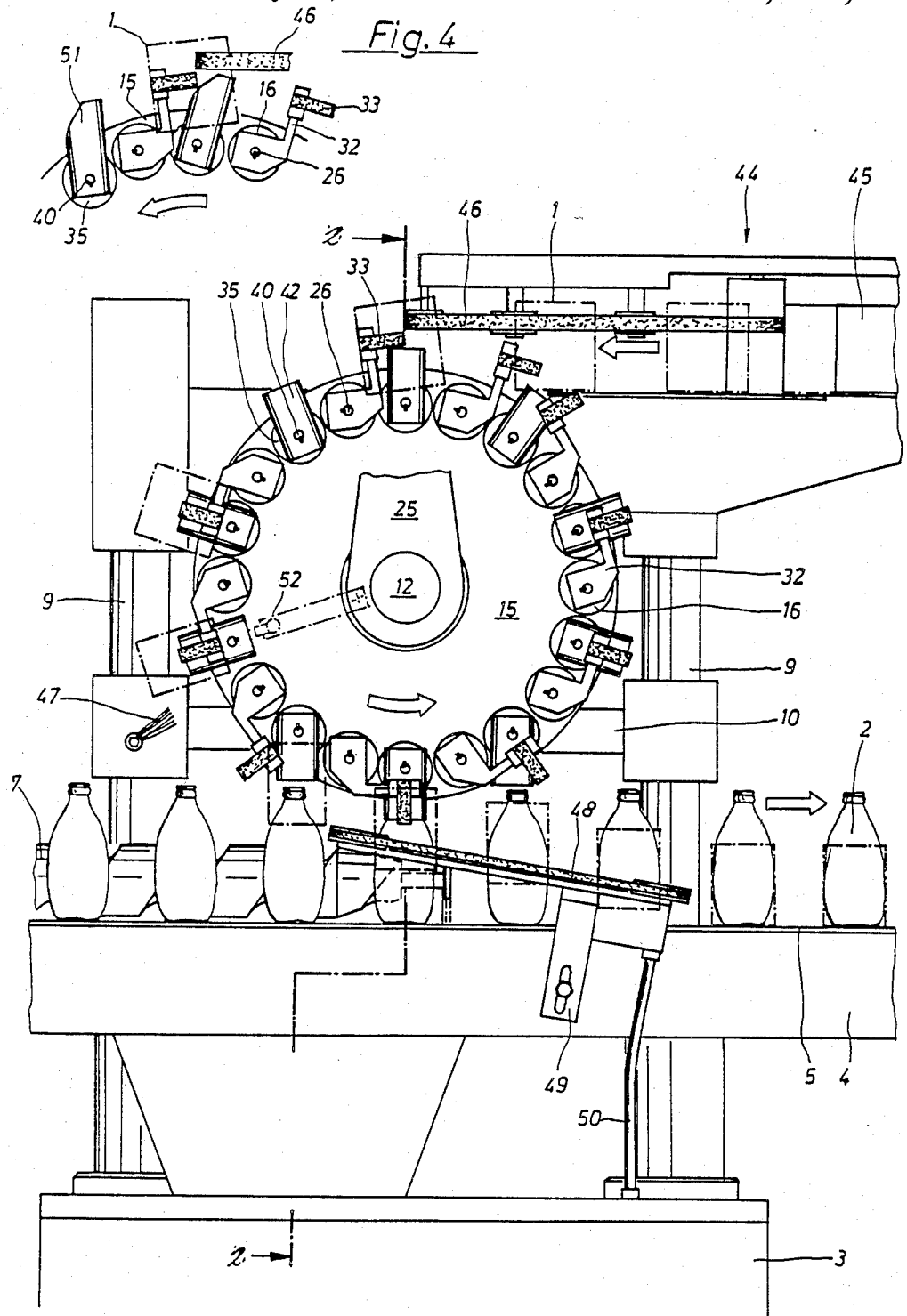

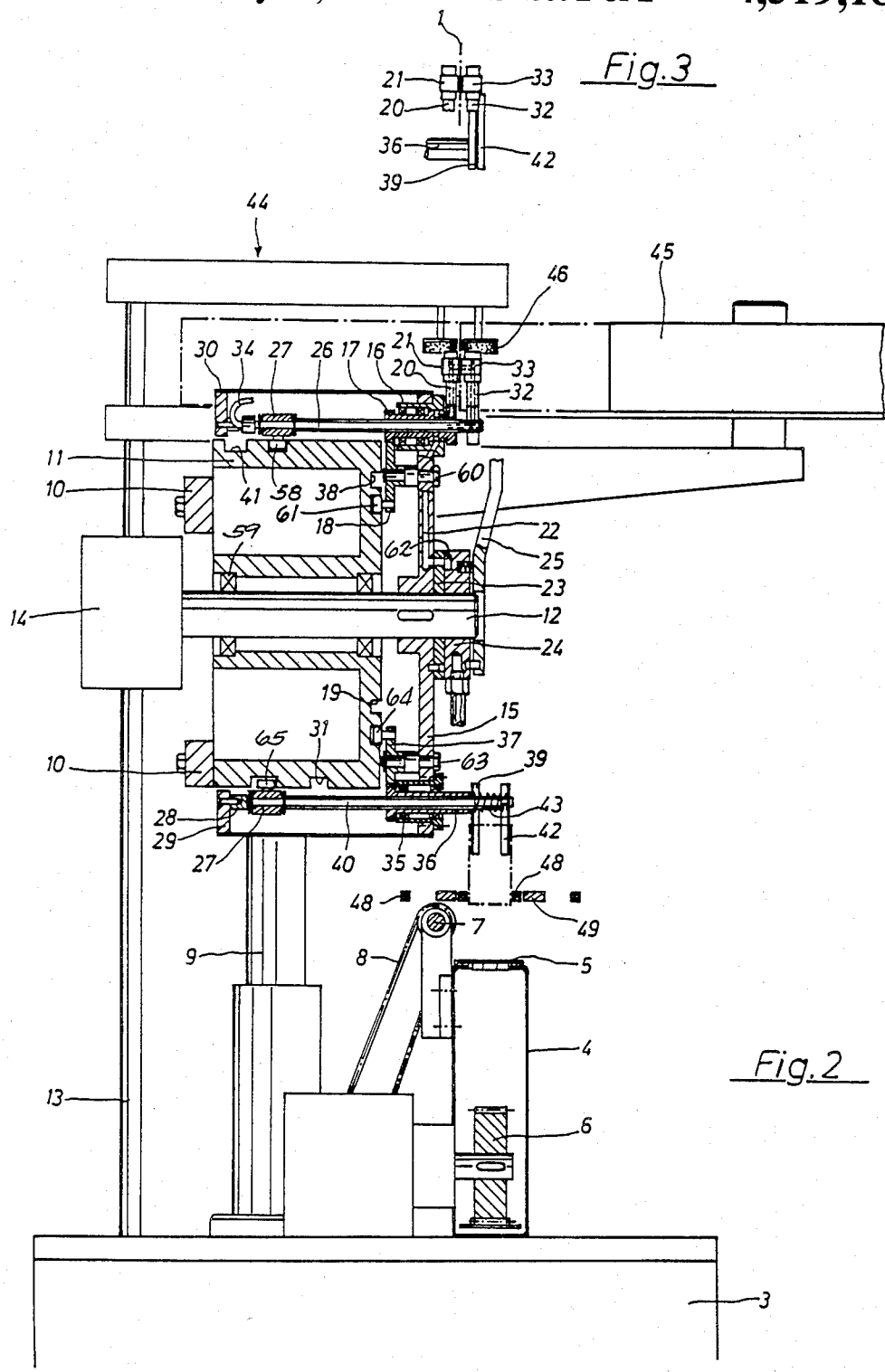

DEVICE FOR ATTACHING TUBULAR SEGMENTS OF PLASTIC FILM ON VESSELS

BACKGROUND OF THE INVENTION

The invention concerns a device for attaching tubular segments of plastic and other film materials on vessels such as bottles or cans.

Such a device is already known, where vacuum suckers are arranged separately and rigidly about a separate rotor rotating about a vertical axis and carrying pairs of expanding mandrels. The rotor turns next to a feeding device for the flat individual tubular film segments. The revolving vacuum grippers or suckers cooperate with a fixed sucker arranged in the transfer region which sucker partially opens the tubular segments. Into the partly opened tubular segments are pushed the expanding mandrels that are mounted for radial movement on the rotor and are widened at the same time, opening the tubular segments by the rotary movement of the rotor alone. This device has fairly high output because of the substantially continuous operation. A problem, however, is the transfer of the tubular segments between the suckers and the expanding mandrels, whose separate paths of revolution overlap only briefly, so the entire film segment unfolding or opening process must take place during the transfer. This can only be ensured with relatively stable and small-faced tubular segments, as they are used, for example, for covering bottles. Even so there is a risk of an undesired slipping or tearing of the tubular segments. This known device is not suitable for applying labels and large-surfaced tubular film segments or sleeves, as they are used, for example, as label substitutes for enveloping the bodies of bottles.

In another known device for applying tubular segments on bottles a first rotor is behind the segment feeding device and revolves with the individual suckers about a horizontal axis of rotation. A second rotor for attaching the individual tubular segments directly on the vessels has suckers instead of expanding mandrels arranged in pairs at regular intervals. In this known device a greater range of rotor revolution is available for opening the tubular segments, but again only small-faced tubular segments or tubular segments with a smaller diameter can be processed, since it is hardly possible to keep large diameter tubular segments open with a single pair of suckers, and thus to place them on the vessels.

Finally a device is known for applying tubular segments on momentarily stopped vessels with a single rotor revolving intermittently about a horizontal axis of rotation, which rotor is provided with several radially directed pairs of split mandrels at regular intervals. The rotor is preceded by a first pair of suckers grasping the tubular segments from a feeding device and turning them over the split mandrels after which a second pair of suckers pull the tubular segments from the mandrels and place them on the vessels, whereby the two pairs of suckers rest on a common ascending and descending carriage. This known device is not suitable for high outputs because of its strictly intermittent operation.

SUMMARY OF THE INVENTION

The invention disclosed herein achieves a substantial increase in the range of action and overlap time in a device of the above-described type, while maintaining the simple design and the continuous operation, and particularly permitting gentle and exact application on vessels of labile or thin and flexible tubular segments having a relatively large diameter.

In a device according to the invention, pairs of suckers and pairs of expanding mandrels move in constant correlation on the same rotor so that the entire range or large angle of rotor revolution between the segment infeed device, where the flat tubular segments are grasped by the suckers, and the place of attachment, where the completely opened tubular segments are placed on the vessels by the expanding mandrels, is available for opening or spreading the sides of the tubular segments and for depositing them on the expanding mandrels. This permits a gentle and exact operation even at high outputs, as is highly desirable in the process of enveloping bottles with tubular segments of thin heat-shrinkable foil or film. The relative movement between the suckers and the expanding mandrels can be effected by the suckers alone, so that the expanding mandrels need not be moved in a radial direction relative to the rotor axis.

Particularly advantageous further features regarding the movement and the arrangement of the suckers and expanding mandrels on the rotor as well as of the construction of the device will be evident in the ensuing description of an embodiment.

An embodiment of the invention and a variant will now be described in reference to the drawings.

DESCRIPTION OF THE DRAWINGS

FIG. 1 shows a side elevation of a device for attaching shrinkable sleeves on vessels such as bottles;

FIG. 2 shows a section 2—2 according to FIG. 1;

FIG. 3 shows a front view of the suckers and expanding mandrels during the reception of a shrinkable sleeve; and FIG. 4 shows a variant in the movement of the expanding mandrels during the reception of a shrinkable sleeve.

DESCRIPTION OF A PREFERRED EMBODIMENT

The device, for example, is for slipping printed sleeves 1, in the form of cylindrical tubular segments of heat-shrinkable plastic film, on vessels such as glass bottles 2. For example, the printing may identify the contents of the bottle and serve as a label. The device includes a housing 3, in which the various driving and control means, including a vacuum pump are arranged but are not visible. On housing 3 is arranged a frame 4 for a horizontal hinge frame conveyor chain 5 which is driven continuously in the direction of the straight arrow in FIG. 1 by a chain wheel 6. In the bottle infeed region of the device is rotatably mounted next to hinge frame chain 5 a conveyor screw 7 for feeding bottles 2 separately and continuously. The conveyor screw is driven in synchronism with hinge frame chain 5 by a roller chain 8. Two standards 9 with vertically adjustable traverses 10 are arranged on housing 3, on which traverses a drum-shaped bearing box 11 is secured stationarily. In the box 11 a horizontal rotatable shaft 12 is journaled in ball bearings 59. Shaft 12 is driven in the direction of the curved arrow in FIG. 1 via a kingpin 13 shown in FIG. 2 and an intermediate direction-changing gear box 14 in synchronism with hinge-frame chain 5 and with the conveyor screw 7. At the free end of rotatable horizontal shaft 12 in the region about hinge frame chain 5 a disk-shaped rotor 15 is secured which thus rotates in a vertical plane.

On the circumference of rotor 15 are fixed several sleeves 16 uniformly or equiangularly distributed over a common dividing circle, in which sleeves 16 there are rotatably mounted bushings 17 rotating about horizontal swivel axes extending parallel to the axis of rotation of rotor 15. Bushings 17 are provided at their ends nearest to bearing box 11 with gear teeth which are engaged by a toothed gear segment 18. The segment is pivotally mounted by means of a pin 60 secured on rotor 15 and is also provided with a cam guide roller or follower roller 61. The follower roller 61 engages a first closed cam groove 19 provided in the vertical end face of bearing box 11, which thus controls the swivel of bushing 17 during a revolution of rotor 15. At the other end of bushing 17, which is on the side of rotor 15 most remote from bearing box 11, there is a lever arm 20 in the form of an angle lever whose free end carries a vacuum pick-up element or sucker 21 having several longitudinally spaced orifices or suction bores. These suction bores are connected, by way of channels 22 in the lever arm 20, in bushing 17, in sleeve 16, and in rotor 15, to a perforated disk 23 provided at the front end of rotor 15. On this disk 23 bears resiliently a fixed vacuum supply disk 24 which is connected by way of a hose to the vacuum pump (not shown) and is secured against rotation by an arm 25. The fixed disk 24 has on the side facing perforated disk 23 a curved channel which puts suckers 21 in communication with the vacuum source during revolution of the rotor 15 over a certain angular range to thereby permit the vacuum on the suckers to be turned on and off for gripping and releasing a sleeve at the proper times.

Furthermore each bushing 17 has an axially displaceable, but non-rotatable axially bored splined shaft 26 which carries at its end nearest to bearing box 11 a block 27 having a cam roller 58. Block 27 is fixed in axial direction on splined shaft 26 and is secured against rotation by means of a non-visible lateral arm and a bar 28 extending parallel to the splined shaft 26. Bars 28 are connected at one end to rotor 15 and at the other end to a cylindrical cover 30 secured in a ring 29. The cam roller 58 on block 27 engages a first closed cam groove 31, which is formed on the cylindrical outer circumference of bearing box 11. Due to this cam groove 31, the axial position of splined shaft 26 and its axial displacement, respectively, are exactly controlled during a revolution of rotor 15. At the other end of splined shaft 26, which protrudes on the other side of rotor 15 from the respective bushing 17, is secured another lever arm 32 in the form of an angle lever which carries at its free end again a ledge-shaped sucker 33 whose suction bores are connected through channels inside angle lever 32 and axially bored splined shaft 26 with a hose 34 connected rotatably at its other end, which hose is connected to the respective vacuum channel 22 in rotor 15. The two suckers 21 and 33 of a pair are thus simultaneously connected with and disconnected from the vacuum source periodically during rotation of rotor 15. Besides, the suckers are turned jointly in a controlled manner by means of groove cam 19 acting on follower roller 61 and toothed gear segment 18 about the swivel axis defined by rotary bushing 17, while their mutual interval is regulated by the cam groove 31 independent of the swivel movement. The suction bores of the two suckers 21, 33 of each pair are aligned with each other so that they can receive and hold opposite sides of a flat tubular heat-shrinkable bottle covering sleeve 1.

Now that the construction of the pairs of cooperating suckers 21 and 33 and the means for operating them have been described, the mandrels to which the shrinkable tubular segments are transferred from the suckers for subsequently being placed on the bottles will be described.

Between each of any two angularly spaced apart sleeves 16 that are fixed in rotor 15 is secured on the same dividing circle another sleeve 35 in which another bushing 36 is mounted rotatably about a swivel axis extending parallel to the axis of rotation of rotor 15. Bushing 36 is provided at its end nearest to bearing box 11 with gear teeth which engage a toothed gear segment 37. The latter is mounted rotatably by means of a stud bolt 63 on rotor 15 and has a cam roller 64, which engages a second closed cam groove 38 formed on the flat front end of bearing box 11. At the end of each bushing 36, which is arranged on the other side of rotor 15, and thus on the same side as suckers 21, 33, is secured an expanding mandrel 39. The mandrel consists of a slightly curved metal strip of substantially rectangular form. In each bushing 36 is also received a splined shaft 40 which is axially displaceable but non-rotatable. At the end of bushing 36 nearest to bearing box 11 is arranged a non-visible arm with a cam groove for free rotation, but fixed in axial direction. The arm secures block 27 against rotation in connection with the adjacent bar 28 while a cam roller 65 engages a second closed cam groove 41 formed on the cylindrical outer circumference of bearing box 11. At the other end of spline shaft 40 which protrudes from bushing 36 and which lies on the other side of rotor 15 another expanding mandrel 42 of the same basic form is secured, but it is curved in the opposite direction of expanding mandrel 39. A spring 43 is captured between the two expanding mandrels 39 and 42. The two thin-walled shell-shaped expanding mandrels 39, 42 can thus be turned jointly about the spline-shaft 40 axis. The cam groove 41 angular position relative to rotor 15 during its revolution being defined at the front end of bearing box 11 by the second closed cam 61 in connection with toothed gear segment 37. Independently thereof, the distance between the two expanding mandrels 39, 42 of each pair is defined by the second cam groove 41 in the periphery of bearing box 11 in conjunction with bearing block 27 and the second spline shaft 40 during a revolution of the rotor. Cam groove 41 cooperates with cam roller 65 to cyclically pull mandrel 42 toward mandrel 39, that is, to reduce the distance between the mandrels. Expansion of mandrels 39, 42, that is, increasing the distance between them can be effected, if desired, by compression spring 43 alone.

On the two standards 9 a conventional feeding device 44 is arranged for feeding the heat shrinkable sleeves 1 to rotor 15. Sleeves 1 are stored in a delivery roll 45 in the form of a flat tube. The feeding device cuts the sleeves from the roll and speeds them up and then brings them, by means of a pair of continuously running close and parallel belts 46, tangentially to rotor 15 and the path of revolution of suckers 21, 33, respectively. Feeding device 44 is driven from kingpin 13 in synchronism with rotor 15 so that the folded shrinkable sleeves can be introduced accurately between suckers 21 and 33 at their circumferential speed.

As can be seen in FIG. 2, the inner expanding mandrels 39, which are fixed against axial movement, have a greater axial distance from rotor 15 than the inner fixed sucker 21. Hence, it is possible for the closed expanding mandrels 39, 42 to go past the supplied shrinkable sleeves 1 when the sleeves are introduced between the leading suckers 21, 33. This condition is shown in FIG. 3. The pivotal movement of the suckers can be kept very small this way.

If the shrinkable sleeves 1 cover only the upper part of a bottle or the bottle seal, the conveyor screw 7 can cover the entire feeding range below the rotor 15. In the present example, however, sleeves 1 are long enough to cover the entire body of glass bottles 2 from top to bottom. Conveyor screw 7, therefore, terminates below the lowest point of rotor 15 and has a conical taper at its end so it does not interfere with the attachment of shrinkable sleeves 1. From the lead screw the glass bottles 2 are advanced by two endless belts 48 extending on both sides of hinge frame chain 5, which start above the end region of the conveyor screw 7 and which engage between the glass bottles 2 still in conveyor screw 7. The two belts 48 are received in a mount 49 which, although they are not shown, has driving and guide rollers, guide bars and so forth which are secured on frame 4 of hinge frame chain 5 for adjustment of the height and angle of belts 48. The adjustment is such that belts 48 also engage the bottom edge of the partly attached shrinkable sleeve 1 and press it against the bottles 2 and gradually pull the sleeve down into the desired end position in the course of the advance movement of glass bottles 2. Each belt 48 is driven by means of a flexible shaft 50 synchronously with rotor 15 in such a way that the horizontal speed component of the belts corresponds substantially to the speed of the glass bottles contained in the end region of conveyor screw 7, so the bottles undergo no speed change as they pass continuously from conveyor screw 7 to belts 48.

The above-described device works as follows: The pairs of suckers 21, 33, directed radially over the major part of their path of revolution, and arranged on the rotor 15 alternatingly, with respective rotationally leading pairs of expanding mandrels 39, 42, are turned shortly before they arrive at the feeding device 44 opposite to the direction of rotation of rotor 15 by action of cam groove 19 on segment 18 until the suckers are about tangential to their path of revolution instead of being radially directed. Thus, the suckers swing out with respect to the expanding mandrels 39, 42 and the suckers then move toward each other by action of cam groove 31 on spline shaft follower roller 58. At the same time shrinkable sleeve 1, which has been removed, cut and accelerated, is fed in a folded or flat state from horizontal belt 46 to the space between the two suckers 21, 33. The two suckers approach each other further until they are completely together in the uppermost or most radially outward position of their path of revolution, and have engaged a sleeve 1 along the front region of their horizontal center line. At this point, the vacuum for the suckers is turned on by action of vacuum source disk 24. The transfer of sleeve 1 from feeding device 44 to rotor 15 and its suckers 21, 33 is now completed.

During further revolution with rotor 15, the pairs of suckers 21, 33 including sleeve 1 held by them, are turned in the direction of rotation of rotor 15 and moved apart at the same time so that shrinkable formerly flat sleeve 1 has its sides pulled apart or separated partially. This rotation is continued for over 90 degrees until suckers 21, 33 are again directed radially on both sides of the leading pairs of expanding mandrels 39, 42. These expandable and contractible mandrels are completely together or closed during transfer of a shrinkable sleeve 1 to them. Transfer from the suckers is to the expanding mandrels 39, 42 which lead the suckers rotationally in the illustrated embodiment. The mandrels are extending substantially radially at this time and lie laterally next to the supplied sleeve 1 (FIG. 3). Then the mandrels are turned slightly against the direction of rotation of rotor 15 so that their outer end region is inclined toward the following pair of suckers 21, 33. This way the attachment of sleeve 1 on expanding mandrels 39, 42 is facilitated during the pivotal movement of the respective pair of suckers 21, 33. During attachment of a sleeve 1, expanding mandrels 39, 42 are turned back into the radial position. After suckers 21, 33 have arrived in their radial position, they are further moved apart and opened. At the same time, the two respectively expanding mandrels 39, 42 are further moved apart and opened, until they have completely unfolded sleeve 1 and grasped it. Compression spring 43 facilitates the synchronization of the two opening movements. Then the vacuum for the respective suckers 21, 33 is turned off, and they are further moved apart so that they no longer hinder the further movement of sleeve 1. Shrinkable sleeve 1 is now held only by the two expanding mandrels 39, 42 over about half their length. After sleeve 1 has been turned by about 90 degrees relative to its plane of revolution during the attachment to the expanding mandrels, one of the end openings of the sleeve now points exactly radially outwardly. Brush 47 in FIG. 1 which brushes into the passing end opening breaks any adhesions and thereby opens the opening completely. This adhesion breaking and opening process can also be augmented or supplemented by directing a blast of air from jet 52 through sleeve 1 as indicated by a dot-dashed line.

The pairs of expanding mandrels 39, 42 are now turned together with the completely widened sleeves 1 somewhat in the direction of rotor 15, until they assume a vertical position as shown near the transfer region at the bottom of FIG. 1. The expanding mandrels 39, 42 continue in this vertical position during the entire sleeve application operation as a result of turning back constantly against the direction of rotation of rotor 15. During the approach to the lowest point of their path of revolution the expanding mandrels 39, 42 guide sleeve 1 with the bottom opening exactly on the glass bottle 2. The bottles are always properly aligned by the synchronized conveyor screw 7. The sleeve is guided by the mandrels until about half the height of the bottle body is covered at the lowest point of the path of revolution. The bottle head has penetrated between expanding mandrels 39, 42, which extend down to the bottle shoulder. Expanding mandrels 39, 42 now somewhat approach each other so that they release sleeve 1 completely under the action of cam groove 41 and are pulled out from glass bottle 2 and from sleeve 1, respectively, while maintaining their vertical position. After emerging completely from sleeve 1, expanding mandrels 39, 42 are then brought gradually into a substantially radial position.

At the lowest point of the path of revolution of expanding mandrels 39, 42, the two belts 48 also engage the bottom edge of shrinkable sleeve 1, as well as glass bottles 2 just leaving conveyor screw 7, so that, after the expanding mandrels 39, 42 are pulled together, or contracted, the vertical fixation of shrinkable sleeve 1 is maintained. Since parallel belts 48 are directed obliquely downward in the conveyor movement direction, sleeves 1 continue to be pulled down on the body of the bottle until the desired end position has been reached. Then glass bottles 2 emerge from between belts carrying the loosely attached sleeves 1 and are fed by hinge frame chain 5 to a heat tunnel (not shown), in which sleeves 1 are heat-shrunk on glass bottles 2.

In the embodiment described herein, the pairs of lever arms 20 and 32, that carry the respective cooperating suckers 21 and 33, are swiveled in a direction that permits depositing the sleeve 1 held by the suckers on the cooperating pair of mandrels 39 and 42 that lead the lever arms and suckers rotationally. It should be understood, however, as has been accomplished in an alternative embodiment not described herein, the lever arms 20 and 32 can be arranged oppositely on their axes. That is, they can be arranged to point oppositely to the direction of rotor 15 revolution instead of in the same direction as in the illustrated embodiment. With this arrangement, the sleeves 1 are transferred from any pair of lever arms and their suckers to the mandrel pair 39, 42 that follows the lever arms and suckers rotationally. Of course, for this arrangement the timing of the camming actions that swivel the sucker arms, spread the suckers, close the suckers and swivel, spread and contract the mandrels must be different than in the illustrated embodiment.

The variant shown in FIG. 4 differs in construction from the above-described device and from its operation only in that the expanding mandrels 51 are turned away from the leading suckers 21, 33 during the transfer of a shrinkable sleeve 1 to the latter. Besides, the expanding mandrels 51 are rounded off at the edge pointing to suckers 21, 33. This way expanding mandrels 51 can be made longer without having to change lever arms 20, 32.

In summary, apparatus for depositing shrinkable sleeves on vessels has been described wherein pairs of vacuum suckers and pairs of expandable mandrels are arranged alternately and angularly spaced apart about the periphery of a single rotor that rotates in a vertical plane about a horizontal axis. The apparatus is distinguished by performing during about one-half of a rotor revolution and on a single rotor the operations of positioning the vacuum suckers to pick up a flat tubular sleeve from a feed station, spreading the suckers to effect spreading of the sides of the sleeve to create an opening, angulating the sleeve so one of its open ends slips over an angularly adjacent contracted mandrel, relieving the sucker vacuum to release the sleeve from the suckers, expanding the mandrel sufficiently for the open end of the sleeve that extends from the mandrel to fit over a vessel, changing the angle of the mandrel so the axis of the sleeve is vertical to align with a vessel that is being conveyed with its axis vertical, and using the descent of the mandrel that results from continuing rotation of the rotor to slip the sleeve over the vessel short of its final position. The last mentioned operation being followed by the operation of slipping the sleeve to its intended final position by frictionally engaging the sleeved vessel with two parallel declined belts that pull the sleeve down while it is moving along with other vessels in a row on a conveyor.

Performing all of these operations smoothly and continuously during a half revolution of the rotor is possible because of the manner in which the sucker pairs and split mandrel pairs are related. Only the axially outer sucker in each pair and only the axially outer half of each split mandrel pair is caused to move axially relative to the rotor. The axially inner sucker in each pair revolves or orbits in a vertical plane that is parallel to the vertical plane in which the axially inner half of the mandrel pair orbits. When the outer sucker is shifted axially outwardly to open a sleeve, the opening of the sleeve overlaps the plane in which the mandrels are orbiting so the sleeve can be fitted over the contracted mandrel by swiveling the arms on which the suckers are mounted. One sucker then contracts axially toward the other and the mandrel continues to orbit in its plane without overlapping the sucker plane so the sleeve can be deposited on the vessel.

In other words, each sleeve segment is shifted from one rotational plane wherein the sleeve is accessed from the supply by the suckers to another rotational plane wherein the sleeve is released from the mandrel to the vessel. The access and transfer operations all occur during a long overlap time existing from the instant the suckers grip a sleeve at the top of the rotor and continuing until the rotor has made one-half of a revolution to the instant at which the sleeve is released to the vessel.

We claim:

1. Apparatus for depositing tubular segments of flexible material such as plastic film on a series of vessels as they move along a predetermined path, the apparatus comprising:

a rotor mounted for being driven rotationally in a vertical plane about a horizontal axis, means for inserting tubular segments into a plane generally parallel to the rotational plane of said rotor, means for moving said vessels along said predetermined path to said rotor, a plurality of sucker means and a plurality of mandrel means respectively arranged alternately and generally in a circle on the rotor about the periphery thereof, each sucker means comprising a pair of cooperating vacuum elements rotatable with said rotor in vertical planes and mechanism mounted on said rotor for swinging said vacuum elements along the rotational plane of the rotor alternately and cyclically in the direction of rotation of the rotor and oppositely of said direction and for moving at least one of said elements generally to the axis of rotor rotation to thereby cause said elements to cyclically move close together and separate in response to said rotor attaining different rotational positions, respectively, each mandrel means comprising a pair of cooperating mandrel elements and a mechanism mounted on said rotor for swinging said mandrel elements along the rotational plane of the rotor alternately and cyclically in the direction of rotation of the rotor and oppositely of said direction and for moving at least one of said elements generally parallel to the axis of rotor to thereby cause said mandrel elements to cyclically move close together and separate in response to said rotor attaining different rotational positions, respectively, said rotational planes of said vacuum elements and mandrel elements being such that when the vacuum elements are together they grip opposite sides of a segment that is inserted between them, when said mechanism separates the vacuum elements they open the segment and align the opening with the mandrel means while said mandrel means are close together and the segment is swung by said mechanism over the mandrel means, and the mandrel elements are separated to effect gripping and transfer of the segment to the mandrel means, whereupon further rotation of said rotor effect transfer of the opened sleeve to a vessel moving in said path.

2. Apparatus for depositing tubular segments of flexible material such as plastic film on vessels comprising:
rotor means mounted for being driven rotationally about a horizontal axis,
a plurality of sucker means each comprised of separable and reclosable cooperating pairs of vacuum elements and means for swinging said vacuum elements on said rotor means and a plurality of expandible and contractible mandrel means mounted alternatingly with said sucker means in circumferentially spaced apart relationship on the rotor means,
means for feeding said segments consecutively toward the rotor means for being engaged by said vacuum elements of the sucker means at one rotational position of the rotor,
conveyor means for transporting said vessels synchronously with the rotor means through a region including another rotational position of the rotor means that is angularly remote from said one position and at which said segments are transferred to said vessels,
means operative to apply vacuum to said vacuum elements in a pair associated with one sucker means to effect engagement of a segment that is fed between them and to relieve said vacuum and release said segment when said sucker means has rotated with the rotor through a predetermined angle,
means operative to effect separation of said vacuum elements in a pair after the vacuum is applied to thereby open the tubular segment and to effect reclosing of said elements after said vacuum is removed and said segment has been transferred to a contracted mandrel,
means for causing said means for swinging said sucker means to swing said sucker means while moving with said rotor means toward said other rotational position to thereby deposit the vacuum engaged and opened segment on a contracted mandrel, and
means operative to expand said mandrel means when said segment is deposited on said mandrel means such that further rotation of the rotor means and said mandrel means will position the segment for being transferred to a conveyed vessel and operative to contract said mandrel means so the segment will be retained on the vessel.

3. The apparatus according to claim 2 wherein said means for swinging said vacuum means comprise a pair of levers journalled for rotation on the rotor means about a common axis and said vacuum elements extend at substantially right angles to the levers, said means for causing said means for swinging to swing causing said vacuum elements to be directed when they are engaging a segment such that the segment being fed is tangential to the path of revolution of the vacuum elements.

4. The apparatus according to claim 2 wherein said other rotational position of said rotor means at which a segment is transferred to a vessel is about 180° in the direction of rotation of the rotor means from where said segment is engaged by a vacuum element pair.

5. The apparatus according to claim 3 wherein said levers are directed substantially radially of the rotor and said vacuum elements in a cooperating pair are substantially tangential to the path of rotor movement immediately after the elements engage a segment and said means for swinging the levers causes said levers and vacuum elements to turn about 90° so as so the vacuum elements are directed radially to permit aligning the opening of the segment with a mandrel.

6. The apparatus according to any one of claims 2, 3, 4 or 5 wherein the plane of revolution of the completely closed pairs of vacuum elements is disposed at a distance from the parallel plane of revolution of the completely contracted mandrels.

7. The apparatus according to claim 2 wherein one of the vacuum elements in a cooperating pair is swingable but constrained against moving parallel to the axis of the rotor means and the other is swingable and also movable along an axis parallel to said rotor means axis by said means that are operative to separate said vacuum elements in a pair.

8. The apparatus according to claim 3 wherein said means for causing said means for swinging said vacuum elements to swing includes a bushing journaled in said rotor means for rotation about an axis radially spaced from and parallel to the rotor axis, one of said levers being fastened to said bushing,
shaft means slidable axially in said bushing and engaged with the bushing for rotation therewith, the other of said lever means being fastened to said shaft means such that the vacuum elements that are supported on the respective lever means are held in alignment,
cam means operatively coupled to said bushing and responsive to rotation of said rotor by rotating said bushing to thereby swing said levers.

9. The apparatus according to claim 8 including:
another cam means operatively coupled to said shaft means and responsive to rotation of said rotor means by shifting said shaft means cyclically in one axial direction and the other to thereby close said vacuum elements on said lever means toward each other for gripping a segment and alternately separate said vacuum elements to effect opening of said segment.

10. The apparatus according to claim 2 wherein:
said expandible and contractible mandrel means each comprise a bushing journaled in said rotor for rotation about an axis radially spaced from and parallel to the rotor axis,
shaft means slidable axially in said bushing and engaged with said bushing for rotation therewith,
said mandrel means including at least one generally radially extending mandrel element fastened to said bushing and another such element fastened to said shaft means such that said mandrel elements are held in alignment,
first cam means operatively coupled to said bushing and responsive to rotation of said rotor by rotating said bushing to control the angle of said mandrel elements so that during one portion of rotor revolution the mandrel elements are properly angulated for receiving a segment from the sucker means and during another portion of rotor revolution said mandrel elements are properly angulated for directing said segment onto a moving vessel, and
second cam means operatively coupled to said shaft and responsive to rotation of said rotor by shifting said shaft means in one axial direction and the other to thereby keep said mandrel elements close together until a segment is deposited thereon from a sucker means and to spread said mandrel elements for holding said segment until it is deposited on a vessel.

11. The apparatus according to claim 10 wherein said second cam means controls the angle of said mandrel elements during one portion of rotor revolution so the elements are inclined toward said sucker means vacuum elements at least during the time a segment is being transferred from said sucker means to said mandrels.

12. The apparatus according to any one of claims 2, 3, 4, 5, 7, 8, 9 or 10 wherein:
said conveyor means for said vessels comprises a conveyor screw for advancing said vessels in a vertical attitude, said screw rotating about a substantially horizontal axis and being generally tangential to the circular path of said mandrel means, said screw terminating substantially below the lowest point in the path of revolution of the mandrel means.

13. The apparatus according to claim 12 including two driven belt loops lying in the same plane and in parallel spaced relationship, said belts, being arranged for their inside runs to contact a segment that has been deposited on a vessel about the time that the vessel is released from the termination of said conveyor screw means, the plane of said belts being declined in the direction of vessel conveyance such that when the belts frictionally grip said segment the segment will be pulled down further on the vessel as the vessel is conveyed.

* * * * *

UNITED STATES PATENT AND TRADEMARK OFFICE
CERTIFICATE OF CORRECTION

PATENT NO. : 4,519,186
DATED : May 28, 1985
INVENTOR(S) : Horst Winter and Erich Eder It is certified that error appears in the above-identified patent and that said Letters Patent are hereby corrected as shown below:

Column 8, line 46, after "generally" insert ---parallel---.

Column 9, line 5, change "effect" to ---effects---.

Signed and Sealed this

First Day of October 1985

[SEAL]

Attest:

DONALD J. QUIGG

Attesting Officer

Commissioner of Patents and Trademarks—Designate